Aug. 15, 1961     C. L. WHEELER     2,995,804
ELECTRODE ASSEMBLY APPARATUS
Filed Dec. 6, 1957     2 Sheets-Sheet 1
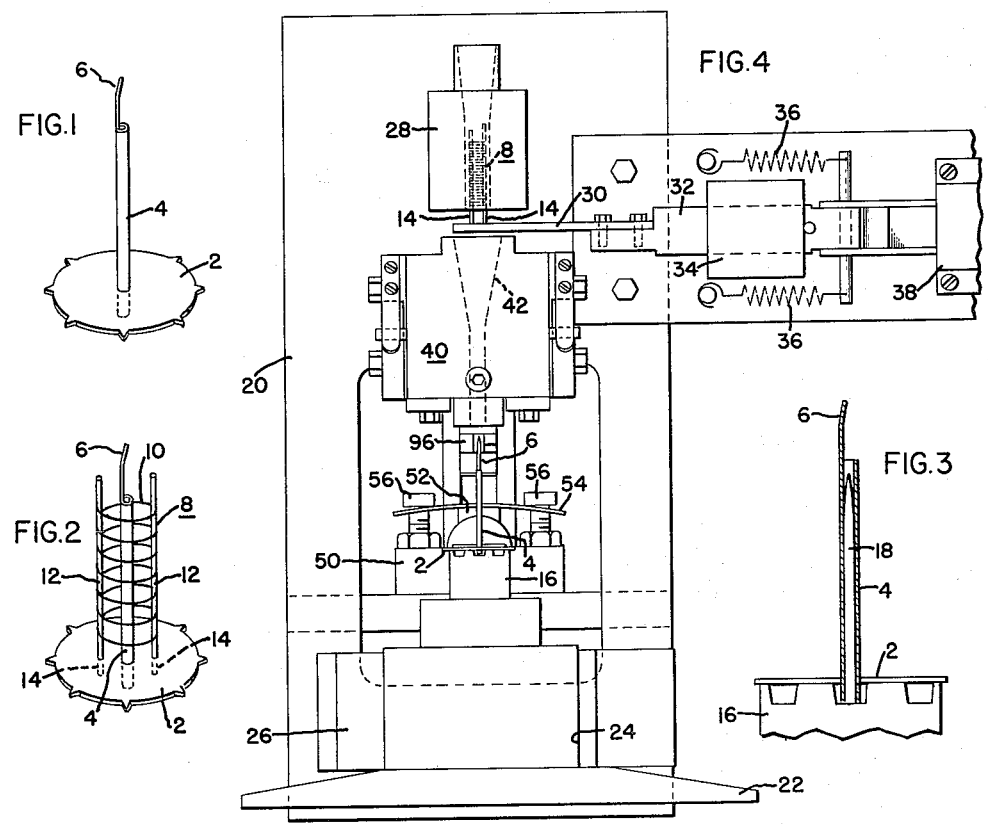
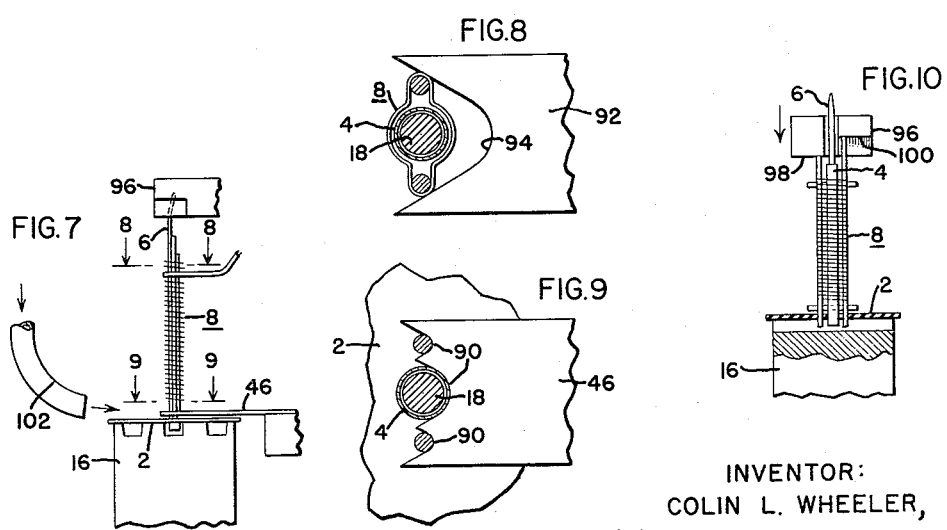
INVENTOR:
COLIN L. WHEELER,
BY *Nathan J. Cornfeld*
HIS ATTORNEY.

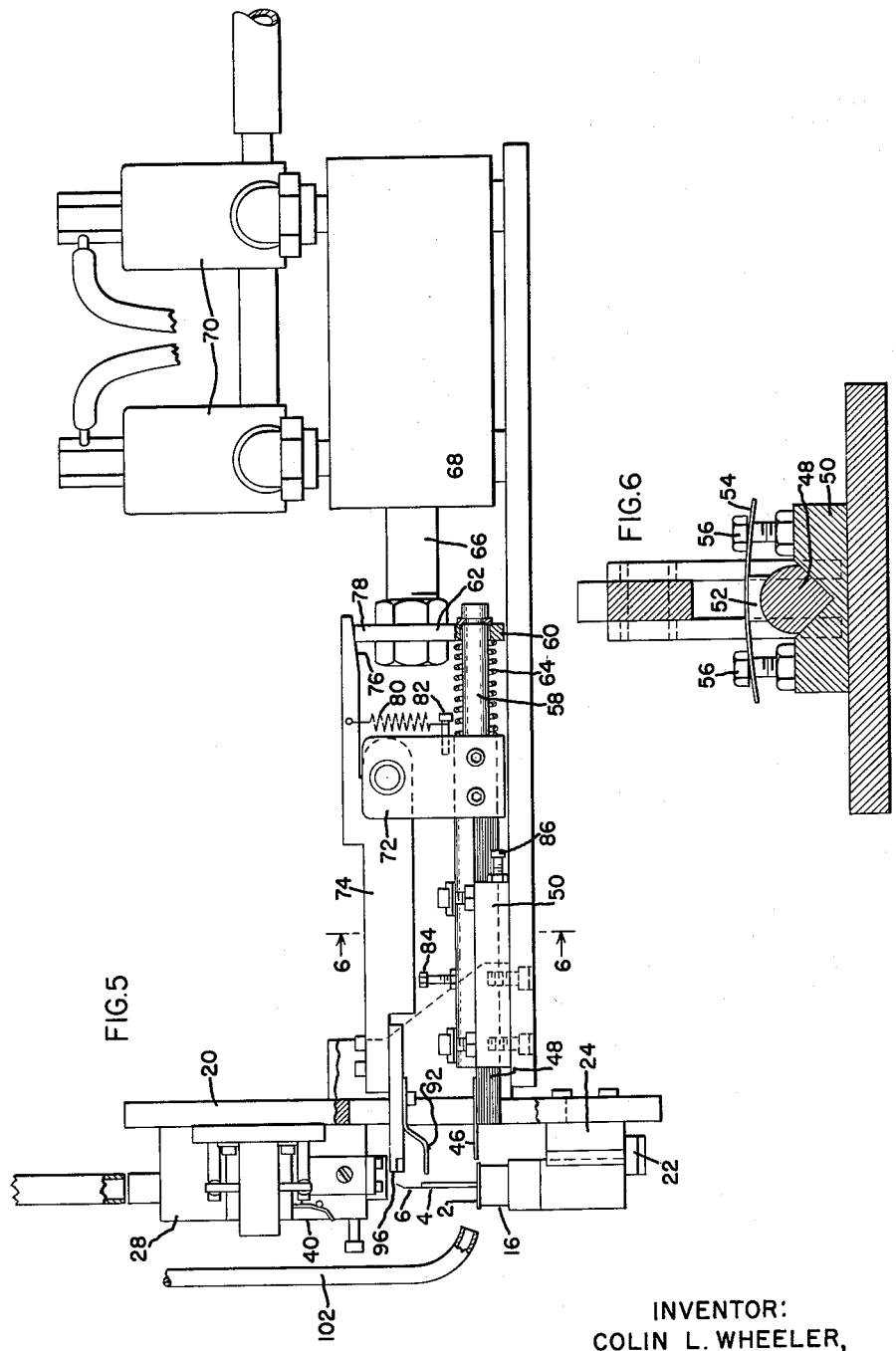

2,995,804
ELECTRODE ASSEMBLY APPARATUS
Colin L. Wheeler, Cambridge, Mass., assignor to General Electric Company, a corporation of New York
Filed Dec. 6, 1957, Ser. No. 701,031
6 Claims. (Cl. 29—25.19)

This invenion relates to the manufacture of electron discharge devices and more particularly to apparatus for automatically assembling electrodes of such devices of the type, such as receiving tubes, wherein the electrodes are of small size, light weight, and delicate nature.

Electrodes of electron discharge devices, such as receiving tubes, are generally of longitudinal hollow cylinder-like form, such as for example cathodes comprising tubes of square, circular or elliptical cross section, grids comprising helically coiled wire of cylindrical or cylinder-like outline, and anodes of cylinder-like or parti-cylinder-like form. Generally such electrodes are assembled and supported, usually in coaxial spaced relation, between transverse insulative plates, such as thin plates of mica. The micas are formed with precisely located apertures through which extend the ends of the electrodes or electrode frame members as the case may be, and thus the micas afford firm support to the electrode as well as permanently securing the electrodes in precisely-spaced relationship for proper electrical operation of the discharge device with its intended electrical characteristics.

The desirability of eliminating costly hand operations in the assembly of such mass produced articles as receiving tubes has been recognized for some time. Reliable automatic apparatus for rapidly assembling the several fragile parts of an electron discharge device such as a receiving tube type has long been sought. However, the small size and delicacy of the parts involved, the need for adherence to relatively close tolerances in positioning and spacing of parts during assembly, and the resulting undesirability of using apparatus involving violent motion or large forces inherently makes many conventional types of apparatus unsuitable.

Accordingly, a principal object of the present invention is to provide apparatus for automatically assembling electrodes of electron discharge devices such as receiving tubes, which will handle the parts gently yet at a rapid rate suitable for automated production, and which will insure proper location of the assembled parts with the precision required, for example, in receiving tubes.

Another object is to provide such assembly apparatus which has relatively few moving parts and few parts with close tolerances, which is of small size suitable for convenient installation in an assembly line, and which will operate reliably for long periods as required in continuous automated production without requiring repair or adjustment.

Briefly, according to one aspect of the present invention, an electrode to be assembled is brought to a position near its correct permanent position relative to an insulative support plate and in coaxial surrounding relation with any other electrodes which may in the assembled device fit within it, by allowing the electrode to fall freely through a guide onto the support plate, with the longitudinal axis of the electrode substantially vertical. After its free fall descent to a roughly correct position, the electrode is precisely positioned in two mutually perpendicular directions transverse to its longitudinal axis, and is then permanently secured to the insulative support plate in proper relation with the other part or parts which it surrounds.

In the drawing,

FIGURE 1 is a perspective view of certain parts of an electron discharge device to which the present invention is adapted, in an early stage of assembly;

FIGURE 2 is a view similar to FIGURE 1, showing a later stage of assembly;

FIGURE 3 shows the structure of FIGURE 1 mounted on a suitable support fixture;

FIGURE 4 is an elevation view of an electrode assembly apparatus constructed in accordance with the present invention;

FIGURE 5 is a fragmentary side elevation view of the apparatus shown in FIGURE 4;

FIGURE 6 is a transverse section view of the apparatus shown in FIGURE 5, taken along the line 6—6 thereof;

FIGURE 7 is an enlarged fragmentary view of a portion of the structure shown in FIGURE 5;

FIGURE 8 is an enlarged fragmentary view of another part of the structure shown in FIGURE 5;

FIGURE 9 is an enlarged fragmentary view of still another part of the structure of FIGURE 5; and FIGURE 10 is an enlarged fragmentary view showing the relative position of the parts after the completion of the assembly operation performed by the apparatus of FIGURES 4 and 5.

Referring to the drawings, the present invention is illustrated in connection with the assembly of a control grid of an electron discharge device of the receiving tube type, onto a support plate of mica or other insulative material apertured to receive the grid, and in coaxial surrounding relation with a tubular cathode.

FIGURE 1 shows a mica support plate 2 with a cathode 4 already mounted thereon. One end of the tubular cathode extends with a snug fit through a central aperture in the mica, thereby supporting the cathode with its axis substantially normal to the mica. The free end of the cathode has an extending tab 6 by which the cathode is connected electrically to the external leads of the completed tube, and the free end of the tab is bent inwardly toward the cathode axis to avoid obstructing other electrodes to be assembled to the mica.

FIGURE 2 shows the mica 2 and cathode 4 after assembly, by the apparatus of the present invention, of the grid 8. The grid includes a cylinder-like helix of fine wire 10 wound on and welded to a pair of longitudinal side rods 12 forming a supporting frame. The lower ends of the side rods serve as feet 14 which are inserted snugly through matching apertures in the mica, and thus the mica holds the grid firmly as well as spaces it exactly relative to the cathode.

As shown in FIGURE 3, the cathode with which the grid is to be assembled may conveniently be supported on a fixture or mount block 16 with the cathode held in an upright position by a pin 18 carried by the mount block and the mica lying flat on a horizontal shelf at the base of the pin.

Turning now to FIGURE 4, the electrode assembly apparatus of the present invention includes a frame 20 at the base of the front of which is an apron or ramp 22 adapted to receive the fixture 16 and onto which the fixture may be conveniently placed either manually or by suitable placement apparatus. Adjacent the ramp is a pair of vertical mutually perpendicular reference surfaces 24, 26 on the frame against which the fixture may be firmly seated so as to locate the cathode 4 and mica 2 conveniently relative to the frame.

Near the top of the frame and in substantially vertical alignment with the cathode support pin 18 is a grid magazine 28 into which grids are arranged to be fed from above one at a time. A grid is supported in the magazine 28 with its longitudinal axis more or less vertical and with the bottom of the grid, i.e. the feet 14 formed by the lower ends of the grid side rods 12, resting on a shutter 30 carried by a horizontally reciprocal slide 32 mounted in a guide 34. The shutter is urged by springs 36 into grid-supporting position and is adapted to be withdrawn from grid-supporting position by a suitable actuator such as a solenoid 38 linked to the slide.

Beneath the magazine is a guide 40 having a funnel-shaped vertical passage 42 with an enlarged mouth at its upper end. The lower end of passage 42 opens directly above the cathode support pin 18 and has a cross-section conforming generally in shape to the cross-sectional shape of the grid so that if the grid is elliptical as shown, or otherwise non-circular in cross-section, the grid will be properly positioned rotatively about its longitudinal axis as it falls through the passage.

Mounted for horizontal reciprocation relative to the mica 2, and in a plane just above it, is a locator blade 46, best shown in FIGURE 5, carried by a horizontally reciprocable V-slide 48 mounted in a V-guide 50 extending rearwardly from the frame 2. As shown in FIGURE 6, the slide 48 is firmly seated in the guide by a bearing block 52 urged down by a spring 54 retained by cap screws 56. Longitudinally extending from the rearward end of the slide is a rod 58 carrying a collar 60 against which a link 62 is urged by a spring 64. The link is connected to the piston 66 of a double-acting air cylinder 68 controlled by solenoid valves 70. Also secured to the rearward end of the slide is a pivot block 72 on which an arm 74 is mounted for pivoting about a horizontal axis. The arm has an upwardly and rearwardly tapered surface 76 engaged by a cam 78 formed by the upper end of the link 62, and surface 76 is urged against the cam by a spring 80 connected between arm 74 and a pin 82 secured to the pivot block. A stop 84 limits downward movement of the forward end of arm 74 and another stop 86 limits forward movement of the slide 48.

Locator 46 has notches 90, as shown in FIGURE 9, sized to receive and precisely locate the feet 14 formed by the lower end of the grid side rods 12, while an upper locator 92 carried by the forward end of the pivot arm 74 is notched as at 94 as to engage the grid side rods 12 adjacent their upper ends for precise location thereof. Also carried by the forward end of the pivot arm 74 is a presser die 96 having respective downwardly facing surfaces 98, 100 adapted to engage the upper ends of the grid side rods 12. In the apparatus shown the surfaces 98, 100 are at different heights so as to engage the ends of grid side rods 12 of different lengths simultaneously.

Positioned just above the mica 2 on the opposite side of the cathode from the lower locator is the mouth of a pressurized air supply tube 102 arranged to direct a stream or jet of air toward the bottom of the cathode 4.

The operation of the grid assembly apparatus will now be described. With the cathode and mica-carrying mount 16 block arranged on the ramp 22 and properly seated against the reference surfaces 24, 26, the shutter 30 is withdrawn to the right as viewed in FIGURE 4, permitting a grid 8 in the magazine 28 to fall into the funnel-shaped passage 42. In falling through the passage 42 the grid 8, if non-circular, is rotatively cammed by the walls of the passage to a position such that its side rods are approximately aligned with the apertures in the mica intended to receive them. As the grid 8 emerges from the lower end of the passage it drops freely over the cathode 4 into surrounding spaced relation therewith. After the shutter 30 returns to its grid-supporting position beneath the magazine, another grid may be fed into the magazine by any suitable means to await the next cycle.

After the grid 8 has been dropped over the cathode the air cylinder 68 is actuated by the solenoid valves 70 so as to move the piston 66 in a forward direction i.e. to the left as viewed in FIGURE 5. This brings the V-slide 48 and the arm 74 forward until the pivot block engages the stop 86, at which point the upper locator 92 is positioned relative to the cathode as shown in FIGURE 8 and the notches 90 in the lower locator 46 register with the grid feet-receiving apertures in the mica as shown in FIGURE 9. At this time the air jet from tube 102 is turned on, pushing the grid 8 gently back against the locators 46, 92 so as to seat the grid side rods 12 and feet 14 in the corresponding notches and thereby precisely position the feet 14 in registry with the apertures of the mica intended to receive them.

Meanwhile the continued forward motion of the piston 66, after the pivot block has engaged the stop 86, is accommodated by the compression of spring 64, and the resulting relative motion of the surface 76 and the link 62 cams the pivot arm down against the stop 84 so as to depress the presser die 96 and push the grid side rods and feet 14 down into the apertures in the mica. The movement of piston 66 is then reversed, allowing the spring 80 to raise the forward end of the pivot arm 74, and, after the link engages the collar 60, withdrawing the upper and lower locators from contact with the grid 8. With the grid thus assembled, the mount block 16 may then be removed from its station on the ramp 22 either manually or by suitable conveying apparatus and the equipment is ready to recycle.

It may be seen that the apparatus above-described has a minimum of moving parts and a minimum of parts requiring close tolerances. Moreover it will be evident that all the electrodes involved are handled delicately yet positioned exactly and with minimum possibility of injury. The apparatus is capable of operating reliably for long periods with a minimum of adjustment, yet its cycle time is quite short, being less than three seconds in one embodiment which has been tested. Accordingly it will be appreciated that apparatus constructed according to the invention is particularly suited for automated high speed low cost production.

It will be appreciated by those skilled in the art that the invention may be carried out in various ways and may take various forms and embodiments other than those illustrative embodiments heretofore described. It is to be understood that the scope of the invention is not limited by the details of the foregoing description, but will be defined in the following claims.

What I claim as new and desire to secure by Letters Patent of the United States is:

1. Apparatus for assembling in an apertured support plate an electron discharge device electrode having a plurality of extending feet adapted to be received in the apertures of the support plate, said apparatus comprising a guide through which the electrode is adapted to descend freely in a feet-downward attitude onto the support plate, a locator having reference surfaces engageable with the sides of said feet and movable to and from a position in which said surfaces are contiguous with said feet-receiving apertures, means including an air jet for yieldably urging said feet against the locator surfaces, and means for relatively moving the electrode and support plate so as to insert the feet in the support plate apertures.

2. Electron discharge device assembly apparatus for assembling in a support plate, in surrounding spaced relation with another electrode already secured to the support plate, an electrode of cylinder-like form having longitudinally extending spaced feet adapted to be received in apertures in the support plate, said assembly apparatus comprising a stationary guide having a substantially vertically extending passage dimensioned to permit the electrode to fall free therethrough in a feet-downward attitude onto the support plate, a locator having surfaces engageable with said feet and movable to and from a position in which said surfaces register with said feet-receiving apertures, means including an air jet for yieldably urging said feet against the locator, means for moving the locator, and means operable by the locator moving means for moving the electrode longitudinally relative to the support plate so as to insert the feet into the feet-receiving apertures in the support plate.

3. Electron discharge device assembly apparatus for assembling in a support plane an electrode of hollow cylinder-like form having at one end a plurality of longitudinally extending spaced feet adapted to be received in apertures in the support plate comprising a stationary vertical guide beneath which the electrode support plate is adapted to be positioned, said guide being dimensioned to permit substantially free fall of the electrode therethrough in a feet-downward attitude and with the longitudinal axis of the electrode substantially vertical, movable locator means having locator surfaces adapted to engage only the sides of said feet and registerable with the feet-receiving apertures in said support plate, means forming an air jet arranged to blow said feet against said locator surfaces, and a pusher engageable with said electrode when said locator surfaces are in registry with the feet-receiving apertures of the support plate for displacing said feet into said feet-receiving apertures.

4. Electron discharge device assembly apparatus for assembling in a support plate an electrode of hollow cylinder-like form having at one end a plurality of longitudinally extending spaced feet adapted to be received in apertures in the support plate comprising a stationary vertical guide beneath which the electrode support plate is adapted to be positioned, said guide being dimensioned to permit substantially free fall of the electrode therethrough in a feet-downward attitude and with the longitudinal axis of the electrode substantially vertical, a locator having reference surfaces engageable with the sides of said feet and movable to and from a reference position in which said reference surfaces register with the feet-receiving apertures in said support plate, an actuator for moving said locator to said reference position, means forming an air jet arranged to blow said feet against said locator reference surfaces, and a pusher operated by said actuator and engageable with said electrode after said locator is in said reference position for displacing said feet into the feet-receiving apertures of the support plate.

5. Electron discharge device assembly apparatus for assembling in a support plate an electrode including a helix of wire wound on a pair of spaced longitudinal side bars, the side bars extending beyond the helix at one end to form a pair of spaced feet adapted to be received in apertures in the support plate, said assembly apparatus comprising a stationary vertical guide beneath which the electrode support plate is adapted to be positioned, said guide being dimensioned to permit substantially free fall of the electrode therethrough in a feet-downward attitude and with the longitudinal axis of the electrode substantially vertical, first and second locators movable to and from reference positions in which respectively the first locator is adapted to engage the sides of said feet and register with the feet-receiving apertures in said support plate and the second locator is adapted to engage said side bars at points spaced above said feet so as to hold said electrode upright, means forming an air jet arranged to blow said electrode against said locators, an actuator for moving said locators, and a presser operated by said actuator and engageable with said side bars after said locators are in said reference positions for displacing said feet into the feet-receiving apertures of the support plate.

6. Electron discharge device assembly apparatus for assembling in an apertured insulation plate an electrode including a helix of wire wound on a pair of spaced longitudinal side bars, the side bars extending beyond the helix at one end to form a pair of spaced feet adapted to be received in apertures in the plate, said assembly apparatus comprising a stationary vertical guide beneath which the insulative plate is adapted to be positioned with its plane horizontal, said guide being dimensioned to permit substantially free fall of the electrode therethrough in a feet-downward attitude and with the longitudinal axis of the electrode substantially vertical, first and second locators notched to receive the electrode side bars and movable to and from reference positions in which respectively the first locator is adapted to engage in its notches the sides of the feet of an electrode standing on the plate and registers said feet with the feet-receiving apertures in said support plate and the notched portion of the second locator is adapted to engage the side bars of an electrode standing on the plate near the tops of the side bars so as to hold said electrode upright, means forming an air jet arranged to blow said electrode against said locators, an actuator for moving said locators, a presser engageable with the tops of said side bars for displacing said feet into the feet-receiving apertures of the support plate, and means controlled by said actuator for operating said presser after said locators are moved to said reference positions.

References Cited in the file of this patent
UNITED STATES PATENTS

| | | |
|---|---|---|
| 2,425,127 | Schafer | Aug. 5, 1947 |
| 2,884,684 | Wolke et al. | May 5, 1959 |

FOREIGN PATENTS

| | | |
|---|---|---|
| 655,312 | Great Britain | July 18, 1951 |